United States Patent [19]
Kerger

[11] Patent Number: 5,282,496
[45] Date of Patent: Feb. 1, 1994

[54] TAP FOR COMPRESSED OR LIQUEFIED GASES

[75] Inventor: Leon Kerger, Helmdange, Luxembourg

[73] Assignee: Luxembourg Patent Company S.A., Luxembourg, Luxembourg

[21] Appl. No.: 862,496

[22] Filed: Apr. 2, 1992

[30] Foreign Application Priority Data

Dec. 23, 1991 [FR] France ................... 91 16025

[51] Int. Cl.[5] ........................................... F16K 21/02
[52] U.S. Cl. .................................... 141/18; 141/95; 141/198; 141/213; 137/45; 137/442; 137/446
[58] Field of Search ............ 141/2, 3, 18, 21, 25, 141/27, 94, 95, 192, 198, 208, 210–216; 137/39, 40, 43, 45, 46, 434, 441, 442, 444, 446, 210; 222/3, 4; 73/306, 317

[56] References Cited

U.S. PATENT DOCUMENTS

| | | |
|---|---|---|
| 1,447,797 | 3/1923 | Loudon ................. 137/43 X |
| 2,396,233 | 3/1946 | Abrams ................. 137/43 X |
| 3,211,175 | 10/1965 | Replogle .............. 141/18 X |
| 3,929,155 | 12/1975 | Garretson ............. 137/430 |
| 4,064,907 | 12/1977 | Billington et al. .... 137/614.2 |
| 4,274,431 | 6/1981 | Keller ................... 137/43 |
| 4,462,417 | 7/1984 | Trinkwalder, Jr. ...... 137/39 |
| 4,510,964 | 4/1985 | Wendling .............. 137/210 |

FOREIGN PATENT DOCUMENTS

| | | |
|---|---|---|
| 871180 | 2/1979 | Belgium . |
| 0023072 | 1/1981 | European Pat. Off. . |
| 0071831 | 2/1983 | European Pat. Off. . |
| 1049815 | 2/1959 | Fed. Rep. of Germany ........ 137/43 |
| 2540595 | 8/1984 | France ........................... 137/434 |

OTHER PUBLICATIONS

Search Report issued Oct. 2, 1992 in the corresponding French Application Ser. No. 91 16025, filed Dec. 23, 1991.

*Primary Examiner*—J. Casimer Jacyna
*Attorney, Agent, or Firm*—Leydig, Voit & Mayer

[57] ABSTRACT

The tap comprises inside the cylinder, a two-way valve (30) permitting both filling and draining of the gas cylinder.

The valve (30) comprises at least two lateral openings (34, 36) which can be sealed off by a sealing device (40) provided with an axial orifice (48) for the passage of gas and which slides axially in the shell (32) between a position of obstruction of the openings (34, 36), through the effect of a spring (44), and a position of opening against the action of the spring (44), through the effect of the pressure of the filling gas and a level-controlling valve (52) actuated by a float (62) at the bottom of the shell (32).

9 Claims, 5 Drawing Sheets

TAP FOR COMPRESSED OR LIQUEFIED GASES

BACKGROUND OF THE INVENTION

The present invention relates to a tap for compressed or liquefied gases, comprising a tap chamber designed in order to be fitted on a gas cylinder and enclosing a closure member at the intersection of an inlet pipe and of an outlet pipe and a means for manoeuvring the closure member.

The invention relates in particular to taps for gas cylinders or bottles which can be recharged by the user himself at a gas dispensing station. In order to fill such a cylinder correctly, observing safety regulations, it is necessary to prevent complete filling of the cylinder in order to retain, above the liquefied gas, a gaseous zone which can act as a buffer in the event of exposure of the cylinder to a heat source and, optionally, be released via a safety valve. Unfortunately, these regulations are not always observed, either due to the absence of means for monitoring filling, or through negligence on the part of the user so that the safety valve acts as the only safety measure.

There are taps in existence with a rudimentary means for monitoring the filling level. This means consists simply of a tube penetrating through the tap and provided, on the outside, with a screw or other closure means. It is the lower end of this tube which, in principle, has to define the maximum filling level on the basis of, when the level of liquid gas reaches the tube, the liquid overflowing via the tube, whereas, before, it was gas which escaped from the cylinder via the tube. Consequently, filling should be interrupted when the liquefied gas begins to emerge via the monitoring tube. Obviously, these devices lack precision and represent a source of atmospheric pollution.

Devices for automatically stopping filling do not exist to date for gas-cylinder taps. However, in other fields, for example gas tanks for motor vehicles, level-controlling valves are commonly used for automatically stopping filling when the level reaches a specific threshold. It has not been possible to use these more efficient monitoring means in gas cylinders because filling and draining of the cylinder have to take place via the same opening and because known level-controlling valves permit gas flow in only one direction.

SUMMARY OF THE INVENTION

The present invention aims to remedy this flaw by means of a novel tap of the type described in the preamble, which comprises a level-controlling valve permitting draining of gas via the level-controlling valve.

In order to attain this objective, the tap proposed by the present invention is characterised in that the inlet pipe communicates, on the side opposite the closure member, with a two-way valve permitting both filling and draining of the gas cylinder, comprising a shell with at least one lateral opening which can be sealed off by a sealing device provided with a passage for gas and displaceable between a position of obstruction of the openings through the effect of an elastic means and a position of opening against the action of the elastic means through the effect of the pressure of the filling gas, and a valve actuated by a means for detecting the filling level.

The said valve is preferably a valve with axial movement interacting with a seat of the shell and closing automatically, at the end of filling, through the effect of the pressure of the filling gas when it is released by a cam actuated by the float.

When this valve is not held in the open position by the float, it can be opened by the pressure of the gas if the closure member of the tap is open. The passage of the gases which is defined between the valve and the shell must compulsorily have a cross section greater than that of the passage in the piston.

In order to prevent the liquid gas remaining enclosed in a leaktight manner in the valve after filling, the shell preferably comprises a lateral vent orifice whose cross section is smaller than the cross section of the passage in the piston.

Other distinctive characteristics of the invention will emerge from an advantageous embodiment, presented below by way of illustration, with reference to the appended drawings.

DETAILED DESCRIPTION OF THE PREFERRED EMBODIMENT

Figure 1:
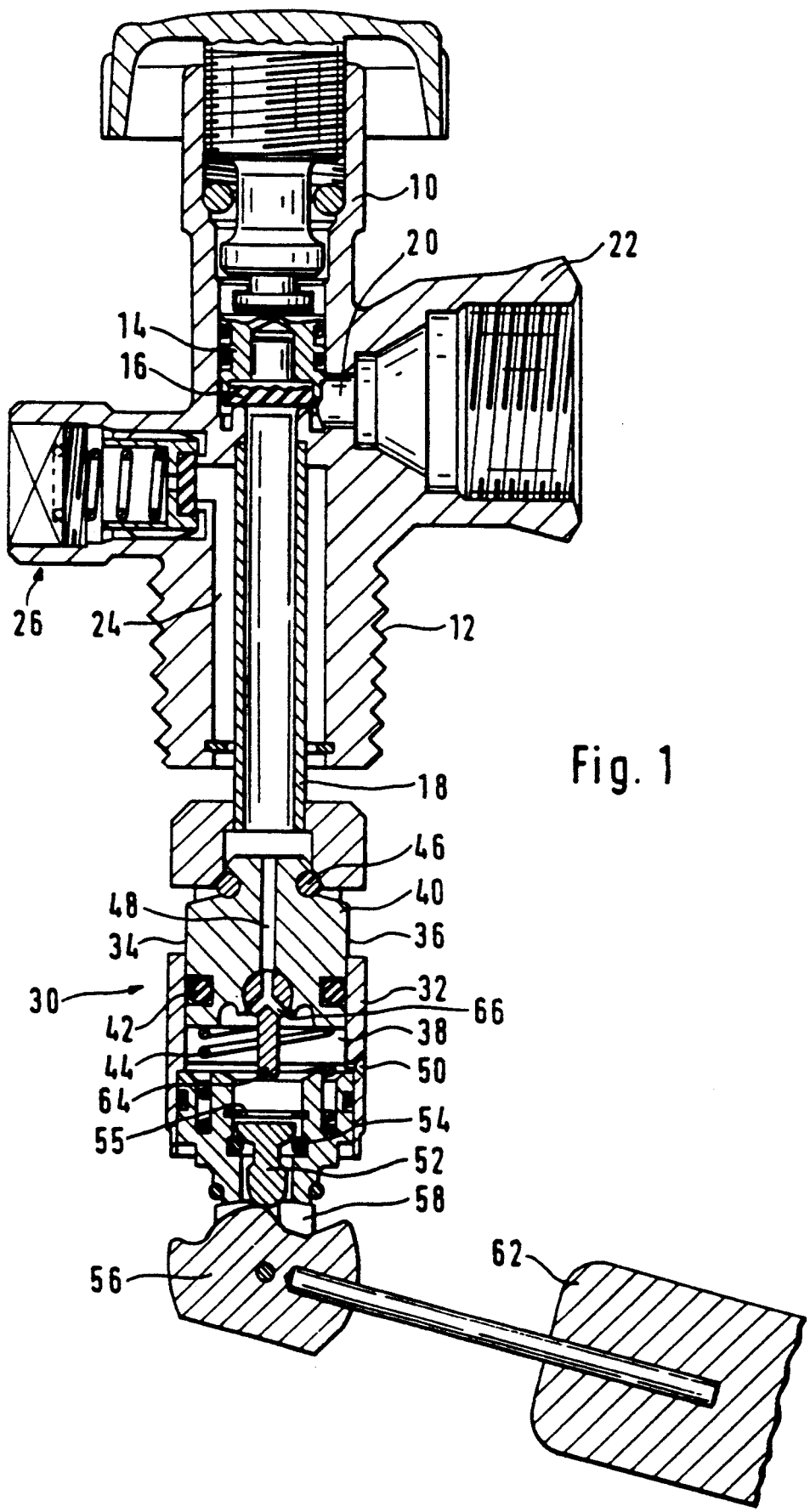
FIG. 1 shows diagrammatically a tap according to the present invention in vertical cross section, in the closed position, and with the level-controlling valve open.

The tap shown in the figures comprises a metal chamber 10, for example made from brass, whose lower part is provided with a screw thread 12 enabling the tap to be screwed onto a gas cylinder or bottle. In a known manner, the tap comprises a closure member 14 with a packing 16 at the intersection of an axial inlet channel 18, communicating with the inside of the cylinder, and a radial outlet channel 20, communicating with a connector 22 which can be connected to a use circuit. The closure member 14 is actuated manually with the aid of a manoeuvring handle or wheel. In FIG. 1, the closure member 14 is in the closed position, its packing 16 being pressed in a leaktight manner against a seat extending the inlet channel 18.

A passage 24 is located around the inlet channel 18, providing communication between the inside of the cylinder and a safety valve 26, which is known per se. This valve enables the gases to escape in the event of abnormal overpressure of the gas inside the cylinder. To this end, the passage 24 must compulsorily be in the gaseous zone, that is to say that the cylinder cannot be filled up to the chamber 10 of the tap.

Figure 2:
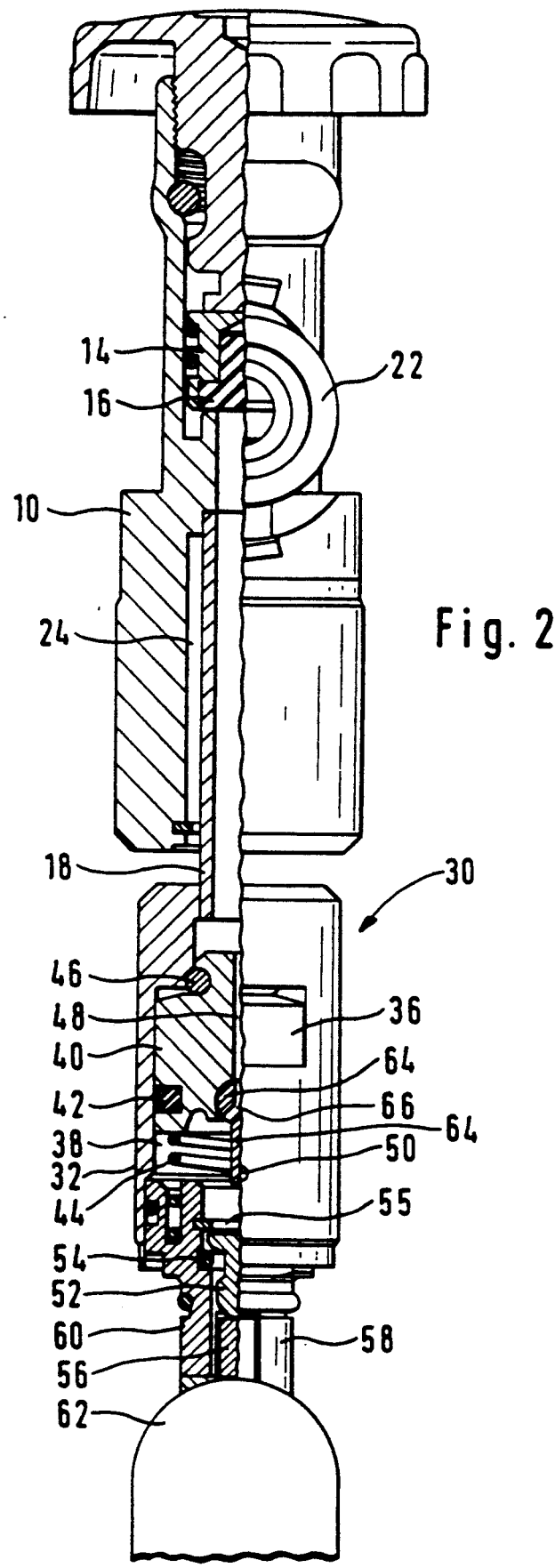
FIG. 2 shows the same tap, partially in section through a sectional plane perpendicular to that in FIG. 1.

In accordance with the present invention, the inlet channel 18 is joined, inside the cylinder, to a two-way valve 30 permitting both filling and draining of the gas cylinder. This valve 30 comprises a shell 32 with two lateral openings 34 and 36 (see FIG. 2). Inside this shell 32 is a cylindrical chamber 38 containing a piston 40 which can slide axially and whose seal with the shell 32 is provided by a gasket 42. This piston 40 is subject to the action of a spring 44 which tends to hold the piston 40 in the position in FIG. 1, in which its head is held, by means of a seal 46, in a leaktight manner against the edge of the shell 32 in order to isolate the two openings 34, 36 of the inlet channel 18. The chamber 38 is in communication with the inlet channel 18 through an axial passage 48 through the piston 40. This chamber 38 is also in communication with the inside of the cylinder through an orifice 50 in the lateral wall of the shell 32.

Figure 3:
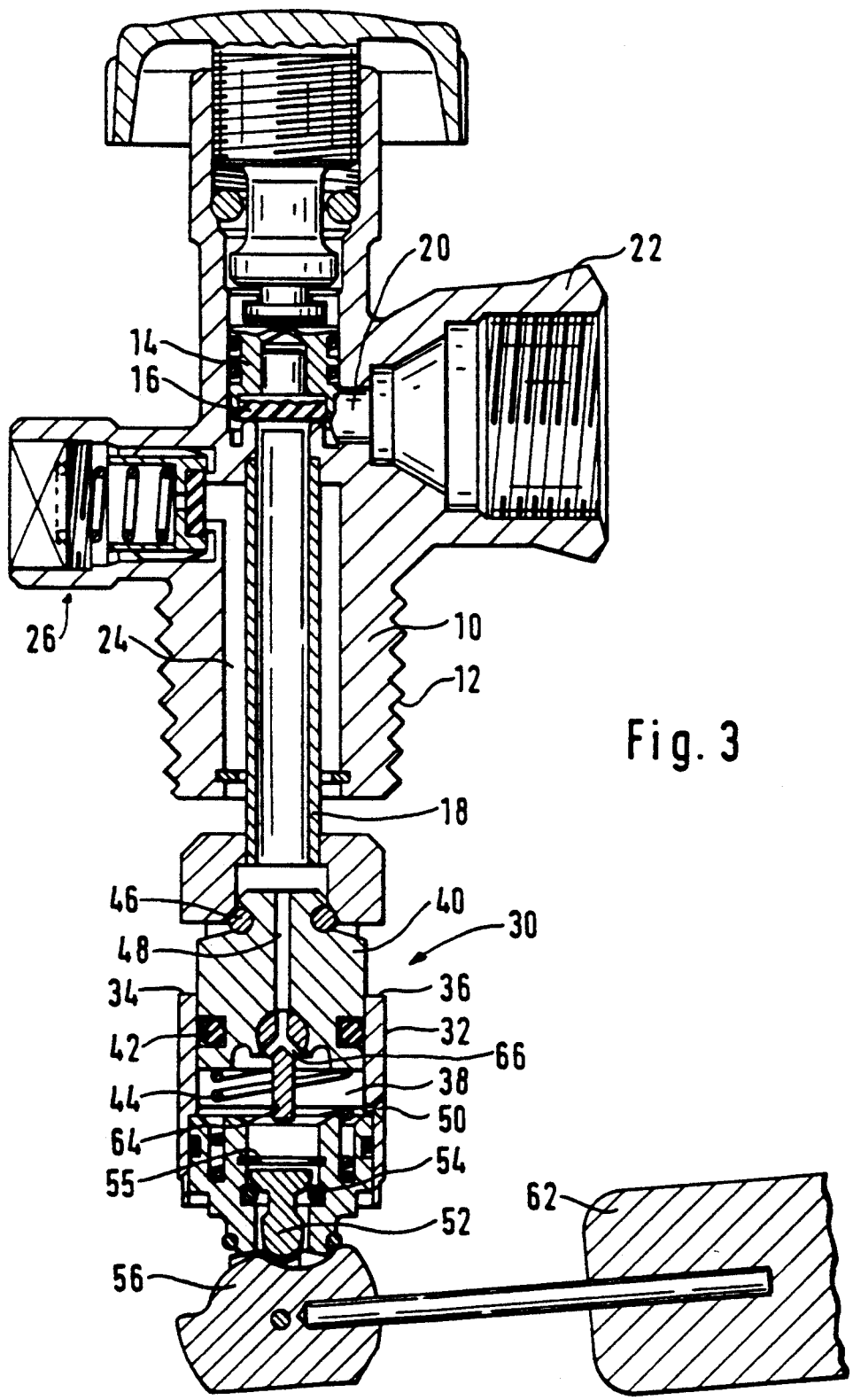
FIG. 3 shows a view similar to that in FIG. 1, with the level-controlling valve closed.

The lower part of the valve 30 consists of the actual level-controlling valve 52. This valve 52 can slide axially between an open position, clearing a passage for the gases between the shell 32 and the perimeter of the valve 52, and a closure position according to FIG. 3, in which the valve 52 is held in a leaktight manner by means of a seal 54 on the lower part of the shell 32 forming the seat of this valve 52. A washer 55 forms a stop for the valve 52 in order to prevent the latter being propelled by the pressure of the gas in the chamber 38.

The valve 52 comprises a rounded foot which interacts with a cam 56 fitted pivotably between two arms 58 and 60 (see FIG. 2) of the shell 32. This cam 56 comprises a suitably profiled contour so as to create an axial movement of the valve 52 by sliding of its foot over this profiled contour. Pivoting of the cam 56 is created by a float 62 through the effect of the rise or the fall of the level of liquefied gas in the cylinder.

The reference 64 denotes a system for locking the two-way valve intended to prevent a bottle being filled beyond the permitted limit when the bottle is tilted or lying down during filling.

A description will now be given of the operation of the tap as described above. In the position in FIG. 1, the manoeuvring wheel holds the closure member 14 in the closed position in order to contain the gas inside the cylinder. When the cylinder is empty, the float 62 has followed the level in the cylinder and is located in a position which is lower than that in FIG. 1. The level-controlling valve 52 is, however, still located in the raised position in FIG. 1, since the part of the profiled contour of the cam 56 which follows the fall of the float 62 is circular with respect to the pivoting center of the cam 56 so that the valve 52 is held in position during clockwise pivoting of the cam 56 relative to the position in FIG. 1.

In order to fill the cylinder, the connector 22 is connected to a gas source and the closure member 14 is opened by the manoeuvring wheel. The pressurised gas penetrates through the action of a pump through the inlet pipe 18 and pushes the piston 40 into the position in FIG. 4 against the action of the spring 44 as far as the chamber 38, thus clearing the two lateral openings 34 and 36 for the passage of gas into the cylinder. The gas also penetrates through the passage 48 of the piston 40 and flows around the valve 52, in the open position, into the bottle.

Given that the surface of the piston 40 in the chamber 38 is higher than the surface of its head opposite the inlet pipe 18, it is necessary to prevent a rise in pressure in the chamber 38, which would risk causing the piston 40 to rise and to close the two lateral openings 34 and 36. To this end, the cross section of the gas flow passage around the level-controlling valve 52 must be greater than the cross section of the passage 48 in order to prevent compression of the gas in the chamber 38.

It would, of course, be possible to fill the cylinder without the lateral openings 34 and 36, given that the gas can flow around the level-controlling valve 52 held in the open position. The presence of the openings 34 and 36, however, permits a considerable increase in the flowrate of the gas and makes filling shorter.

As the cylinder fills up, the float 62 rises and the profiled contour of the cam 56 reaches the top of its circular section, as shown in FIG. 1. When the float 62 pivots, following filling, in an anti-clockwise direction, beyond the angular position of FIG. 1, the cam starts to present a hollow part to the valve 52 and releases the latter to a descent over the seal 54, which comes about through the effect of the pressure of the filling gas. When the valve 52 has closed (see FIG. 3), the increase in the pressure inside the chamber 38 causes the piston 40 to rise in order to close the passage of the gas through the openings 34 and 36.

If, by now closing the tap using the manoeuvring wheel, the chamber 38 and the inlet pipe 18 were to be filled with liquid gas, which would be beyond the field of action of the safety valve 26 and would thus present a danger in the event of overheating. In order to prevent this situation, an orifice 50 has been provided in the wall of the shell 32 which enables the liquid gas to flow into the cylinder after the closure of the tap and thus enables the safety valve 26 to be operative as far as the inside of the chamber 38 and of the inlet pipe 18. The cross section of this orifice 50 must be smaller than the cross section of the passage 48 in the piston 40 in order to permit, after the closure of the level-controlling valve 52 through the effect of the rotation of the cam 56, accumulation of sufficient pressure in the chamber 38 to cause the piston 40 to slide into the position of closure of the lateral openings 34 and 36.

With a view to use of the gas contained in the cylinder, it is sufficient to open the tap using its manoeuvring wheel. When the cylinder is completely full and when the level-controlling valve 52 is closed, that is to say when its foot is located in the hollow of the profiled contour of the cam 56, the flow of the gas from the chamber 38 and from the inlet pipe 18 causes the pressure to fall therein and enables the pressure of the gas in the cylinder to lift the level-controlling valve 52 into the open position. The gas can then flow around the valve 52 and escape through the passage 48 of the piston 40. As soon as the level of liquid gas in the cylinder has fallen to the position, in FIG. 1, of the float 62, the valve 52 is held open by the circular section of the profiled contour of the cam 56 and nothing opposes the flow of the gas through the valve 30 each time the tap is opened.

The distinctive characteristic of the tap is consequently to ensure the automatic stopping of filling without requiring the attention or the intervention of the user, and to do so by means of a two-way valve permitting draining of the cylinder through the level-controlling valve, observing safety regulations, by virtue of which the entire gaseous zone must be located in the field of action of the safety valve.

The automatic closure system described above, stopping filling when the level reaches a predetermined limit, operates in a very reliable manner when the cylinder is upright. However, when the cylinder is tilted or lying down during filling, operation of the float 62 is interfered with such that it can no longer stop the filling when the contents of the cylinder reach the chosen threshold.

Figure 4:
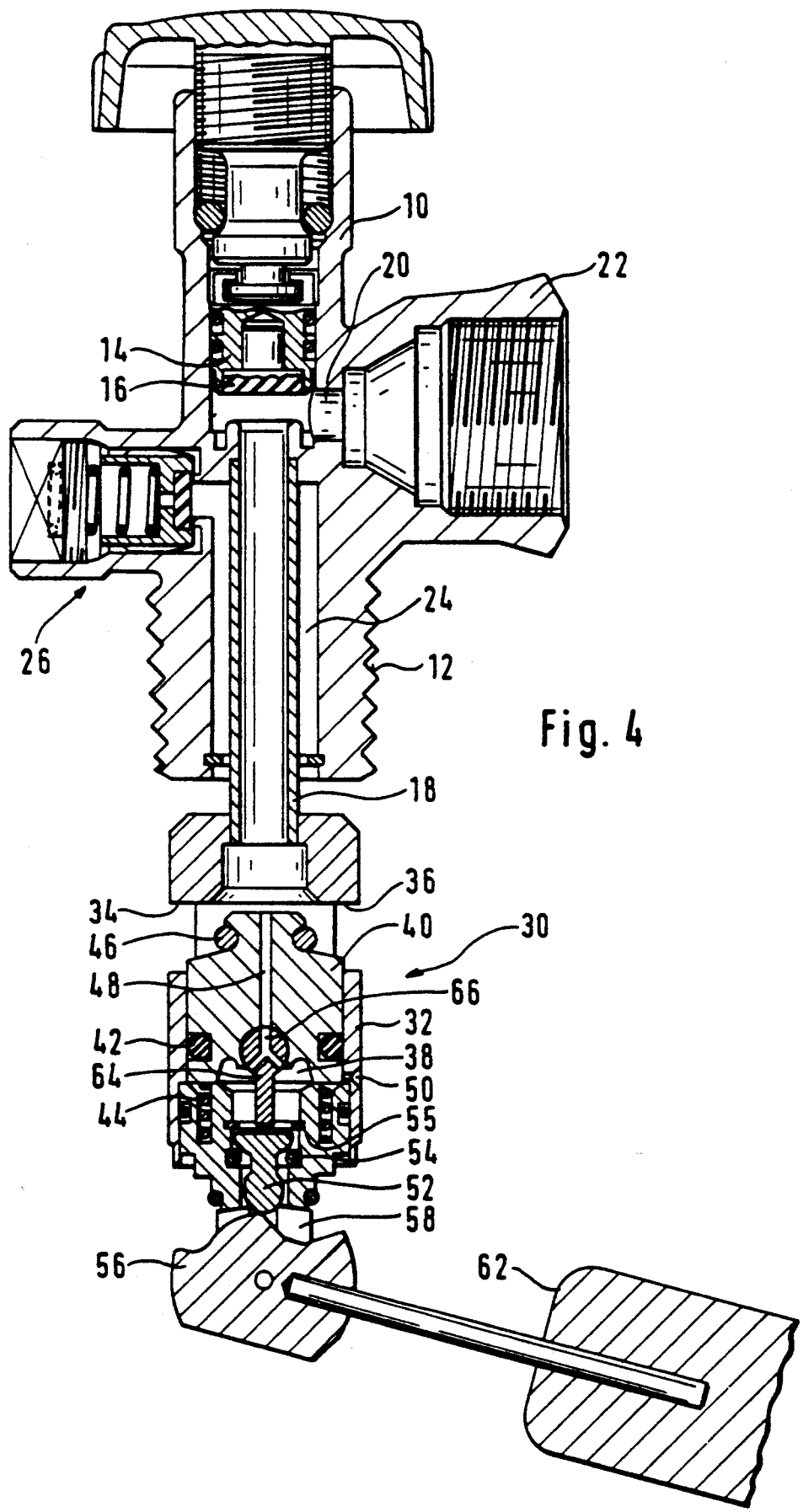
FIG. 4 a view similar to that in FIG. 1 in the filling position.

In order to prepare for such an eventuality, provision has been made for a locking system 64 which automatically immobilises the two-way valve in its closed position when the cylinder is tilted or lying down. This system consists of a pendulum 64 which is suspended by a universal joint, e.g. by a pivot, as shown in the figures, or another universal joint, from the bottom of the sealing device. When the cylinder is upright and as shown in FIG. 4, this pendulum does not interfere with the movement of the sealing-device piston 40 and permits normal operation of the two-way valve with a view to a controlled filling of the cylinder given that the pivot of the pendulum 64 is traversed by a channel 66 in the form of an inverted "Y" which establishes communication between the passage 48 and the chamber 38.

Figure 5:
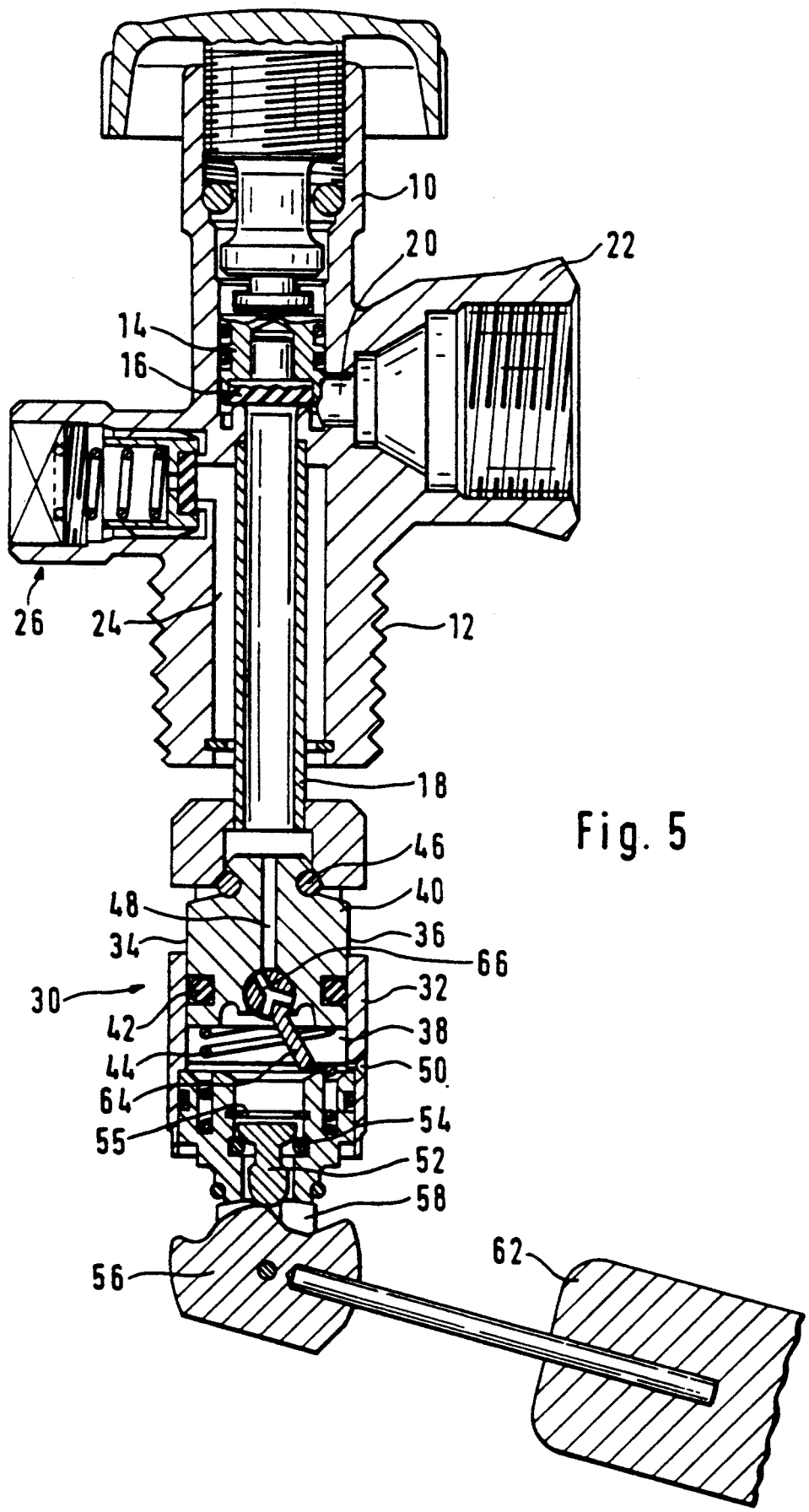
FIG. 5 is a view illustrating the operation of the system for locking the two-way valve.

However, when the cylinder is tilted or lying down as in FIG. 5, the pendulum 64 moves away from its axial orientation so that, when the cylinder is connected, in this position, to a source of filling gas, the pendulum abuts against the edge of the housing of the valve 52 when the sealing device 40 is pushed in through the effect of the pressure of the filling gas. The sealing device consequently remains immobilised in a position of obstruction of the openings 34 and 36 and prevents the filling procedure.

Moreover, following rotation of the pendulum 64 in its housing, the channel 66 of the pivot is no longer in line with the passage 48, so that communication with the chamber 38 through this passage 48 is broken, which also prevents possible slower filling via the orifice 50 and via the perimeter of the valve 52 in the open position.

In order to unlock the system, it is necessary to disconnect the connector 22 from the gas source so that the spring 44 lifts the sealing device 40 and releases the pendulum 64 from its support with a view to filling under normal conditions. In order to avoid these fruitless and superfluous manoeuvres, it is preferable to label the tap appropriately, advising the user that filling can take place only when the cylinder is vertically upright.

I claim:

1. Tap for compressed or liquefied gases, comprising a tap chamber (10) designed in order to be fitted on a gas cylinder and enclosing a closure member (14) at the intersection of an inlet pipe (18) and of an outlet pipe (20), means for manoeuvering the closure member, and a safety valve (26), characterised in that the inlet pipe (18) communicates, on the side opposite the closure member (14), with a two-way valve (30) permitting both filling and draining of the gas cylinder, comprising a shell (32) with at least one lateral opening (34, 36) which can be sealed off by a sealing device (40) provided with a passage (48) for gas, a spring (44) for displacing the sealing device (40) to a position of obstruction of the openings (34, 36) and for permitting the sealing device (40) to move to a position of opening against the action of the spring (44) and through the effect of the pressure of the filling gas, a level-controlling valve (52) movable between open and closed positions and operable, when in said open position, to permit gas to flow between the gas cylinder and the passage (48), and means (62) for detecting the filling level in the gas cylinder and for actuating the level-controlling valve (52) in response to such level, said level-controlling valve, when not held in an open position by said detecting means (62), being openable by the pressure of the gas in the cylinder when the closure member (14) is open.

2. Tap according to claim 1, characterised in that the said sealing device (40) is a cylindrical piston whose upper part comprises a seal (46) which can be applied in a leaktight manner on the wall of the shell (32).

3. Tap according to claim 2, characterised by a passage for the gases which is defined between the said level-controlling valve (52) and the shell (32), the cross section of this passage being greater than that of the passage (48) through the piston (40).

4. Tap according to claim 1, characterised in that the means for detecting the level is a float (62).

5. Tap according to claim 4 characterised in that the said level-controlling valve (52) is a valve with axial movement interacting with a seat of the shell (32) and closing automatically, at the end of filling, through the effect of the pressure of the filling gas when it is released by a cam (56) actuated by the float (62).

6. Tap according to claim 1, characterised by a lateral orifice (50) in the wall of the shell (32) and whose cross section is smaller than that of the passage (48) in the sealing device (40).

7. Tap according to claim 1, characterised by a device (64) for locking the sealing device (40) in a closed position when the cylinder on which the tap is fitted is not vertically upright during filling.

8. Tap according to claim 7, characterised in that the locking device (64) consists of an oscillating pendulum suspended by a universal joint from the bottom of the sealing device (40) and capable of being immobilized in a non-axial position, on a stop through the effect of a displacement of the sealing device.

9. Tap according to claim 8, characterised in that the said joint is a pivot joint traversed by a channel (66) in the shape of an inverted "Y", establishing a communication between the passage (48) in the sealing device (40) and a chamber (38), when the cylinder is vertically upright, and interrupting the said communication when the sealing device (40) is locked by the pendulum (64).

* * * * *